May 25, 1943.   KARL-AUGUST LOHAUSEN   2,320,149
PRODUCER OF PROTECTIVE GASES FOR THE
HEAT TREATMENT OF METALS
Filed Oct. 7, 1940
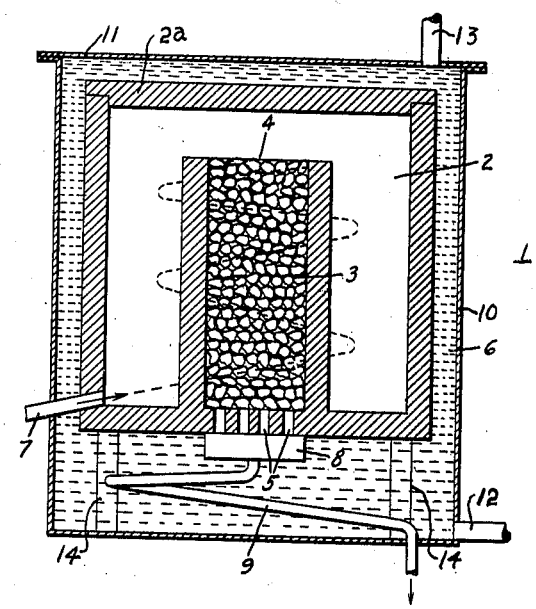
Inventor:
Karl-August Lohausen,
by  Harry E. Dunham
His Attorney.

Patented May 25, 1943

2,320,149

UNITED STATES PATENT OFFICE 2,320,149

PRODUCER OF PROTECTIVE GASES FOR THE HEAT TREATMENT OF METALS

Karl-August Lohausen, Hennigsdorf, Krs. Osthavelland, Germany, assignor to General Electric Company, a corporation of New York Application October 7, 1940, Serial No. 360,148
In Germany November 11, 1939

1 Claim. (Cl. 23—281)

The present invention relates to apparatus for producing protective gases for the heat treatment of metals.

It is known to produce neutral or reducing protective gases for the heat treatment of metals by combustion of hydrocarbons. Gas and air are by this process fed, either mixed the one with the other or separated, to a combustion chamber. For accelerating the reaction and for rapidly obtaining the equilibrium, the combustion gas mixture is conducted over catalyzers at a temperature as high as possible. Up to the present it was usual to arrange the combustion chamber and the catalyzer chamber separated from each other and to equip the catalyzer chamber with a separate heating arrangement.

According to the present invention the catalyzer chamber is arranged concentrically in the combustion chamber to provide an economical producer of protective gas. By this arrangement, the combustion heat is utilized for heating the catalyzer chamber. Consequently, separate heating arrangements are not necessary.

The gas mixture enters preferably from below tangentially into the combustion chamber, so that the flame flows through the combustion chamber in the form of a helical line. The formation of soot in the producer of protective gas is avoided. For a sufficient combustion in the combustion chamber a minimum length of the flame is necessary as otherwise the hydrocarbons, particularly the heavy ones, are merely cracked and soot is deposited chiefly at the surface of the catalyzer mass whereby the catalyzer will be soiled and rendered useless.

According to another feature of the invention a gas collecting chamber is provided below the catalyzer chamber and this gas collecting chamber is surrounded by a cooler. Other advantageous details can be seen from the schematic representation of the apparatus in the only figure of the accompanying drawing.

The producer 1 of protective gas consists of a vertical, cylindrical combustion chamber 2, provided with a cover 2a, and of a catalyzer chamber 3. The catalyzer chamber 3 has apertures 4 and 5 respectively in the upper side and in the lower side. The plant for the production of neutral gas is surrounded by a cooling device 6 for cooling the gas. The gas is admitted into the combustion chamber through an inlet tube 7 tangentially entering the lower portion of the combustion chamber. The cooling device 6 comprises a housing 10 surrounding the combustion chamber 2 and adapted to contain a coolant for cooling the gas. The housing 10 may suitably be provided with a removable cover 11 and inlet and outlet pipes 12 and 13 for circulating the coolant through the housing. The catalyst chamber 3 is supported within the housing by means of supports 14. The gas entering from below tangentially into the combustion chamber flows along a helical line through this chamber and at the top of this chamber into the catalyzer chamber and finally into a gas collecting chamber 8. From this collecting chamber the gas is conducted to the furnace through a cooling tube 9, in which the water from the combustion will be separated.

For instance, 60 cbm. of gas mixture per hour are fed through the pipe 7 to the combustion chamber. The gas mixture consists of 20 to 50% lighting-gas or of 4 to 8.5% propane, remainder air. The flame length is preferably adjusted to from 40 to 100 cm. The catalyzer chamber 3 is filled with lumps of refractory bricks on which a catalyzer is deposited. The deposit is obtained, for instance, by impregnating the lumps of refractory bricks with nickel nitrate and drying and roasting the impregnated lumps for the formation of nickel oxide. Under the action of the combustion products, a reduction thereof to finely distributed catalytic metal takes place.

The combustion chamber is, for instance, of cylindrical shape with the inner dimensions of 650 mm. diameter and 650 mm. height. The cylindrical catalyzer chamber 3 has, for instance, the outer dimensions of 400 mm. diameter and 500 mm. height.

For starting, the gas is admitted through the inlet or combustion tube 7 and ignited through an ignition aperture, which is not shown.

I claim:

Apparatus for producing protective atmospheres by combustion of a gaseous mixture of hydrocarbons and air, said apparatus comprising a vertical, cylindrical combustion chamber in which a gaseous mixture of hydrocarbons and air is burned, a cylindrical catalyst chamber located concentrically in said combustion chamber and adapted to contain a catalyst for accelerating the reactions taking place during combustion of hydrocarbons, the said catalyst chamber having an opening at the top thereof communicating directly with said combustion chamber to permit passage of combustion products formed in said combustion chamber into said catalyst chamber and an outlet for the gaseous products of combustion of the bottom thereof, and means for introducing a burning gaseous mixture of hydrocarbons and air tangentially into said combustion chamber comprising an inlet tube tangentially entering the lower portion of said combustion chamber so that the combustion gases leaving the tube within the combustion chamber pass helically around and in heating contact with said catalyst chamber before entering said catalyst chamber.

KARL-AUGUST LOHAUSEN.